United States Patent Office 3,704,242
Patented Nov. 28, 1972

---

3,704,242
5 - HYDROXY-3-ALKYL-1-(THIOCARBAMOYL OR ALKYLTHIOCARBAMOYL)-PYRAZOLE-4-ALKANOIC ACID DERIVATIVES
Arthur A. Santilli, Havertown, and Dong H. Kim, Wayne, Pa., assignors to American Home Products Corporation, New York, N.Y.
No Drawing. Filed Dec. 30, 1970, Ser. No. 102,952
Int. Cl. C07d 49/18
U.S. Cl. 260—310 R
7 Claims

ABSTRACT OF THE DISCLOSURE

Novel compounds of the formula

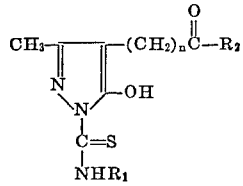

wherein $R_1$ is selected from the group consisting of hydrogen and (lower)alkyl;
$R_2$ is selected from the group consisting of hydroxy, amino and (lower)alkoxy;
$n$ is a whole integer of 1 or 2. The compounds are active as inhibitors of mycobacterium tuberculosis.

---

This invention is concerned with novel 5-hydroxy-3-alkyl-1-(thiocarbamoyl or alkylthiocarbamoyl) - pyrazoles, novel intermediates for their preparation and with processes for their preparation.

The new and novel 5-hydroxy-3-alkyl-1-(thiocarbamoyl or alkylthiocarbamoyl)-pyrazoles are those of Formula I.

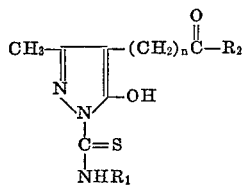

I wherein $R_1$ is selected from the group consisting of hydrogen and (lower)alkyl;
$R_2$ is selected from the group consisting of hydroxy, amino and (lower)alkoxy;
$n$ is a whole integer of 1 or 2.

The compounds of the invention wherein $R_2$ is lower alkoxy are prepared by the following reaction scheme:

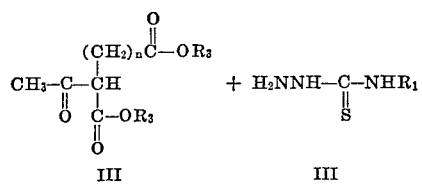

III III

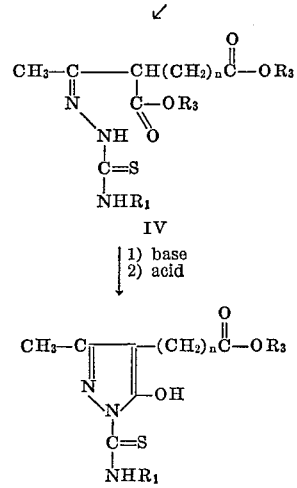

wherein $R_3$ is (lower)alkyl.

The intermediate thiosemicarbozone of Formula IV is prepared by admixing the appropriate substituted thiosemicarbazide with a compound of Formula II in the presence of an inert organic solvent. Generally it is preferred to reflux the reactants for about 2 to about 14 hours. Ring closure is effected preferably in the presence of sodium hydroxide or ammonium hydroxide followed by acidification preferably with hydrochloric or glacial acetic acid. The intermediate compound of Formula IV may be isolated if desired or the ring closure may be effected by the method outlined above. In the alternative the compounds may be prepared by the following reaction scheme:

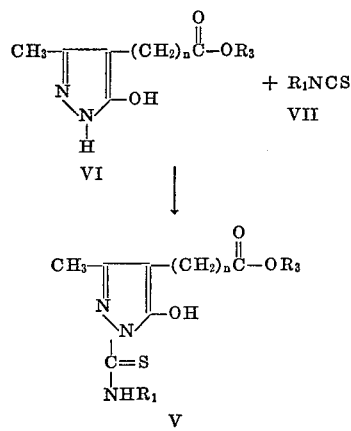

wherein $R_1$, $R_3$ and $n$ are the same as hereinabove described. The preferred method of carrying out this alternate route is to reflux the reactants in the presence of anhydrous tetrahydrofuran or dioxane. The compounds of Formula I wherein $R_2$ is hydroxy may be prepared by hydrolyzing compounds of Formula V.

The compounds of the invention while not being limited thereto are useful for the in vitro inhibition of M. tuberculosis.

Compounds of the invention have been tested by determining the minimal inhibitory concentration which will completely inhibit M. tuberculosis, human type, strain H37Rv. The compounds of the invention have been found to be active when admixed with the test organism in an aqueous dispersion at a concentration of 0.5 µg./ml. The compounds thus may be employed for example in hospitals, sanitariums and the like to effectively inhibit the causative organism of tuberculosis by contacting infected areas and materials with aqueous dispersions of said compounds. In addition the compounds of the invention possess activity against *Endamoeba histolytica*.

EXAMPLE I 5-hydroxy-3-methyl-1-(thiocarbamoyl)pyrazole-4-acetic acid, ethyl ester A mixture of 4.56 g. of thiosemicarbazide, and 10.8 g. of diethyl acetylsuccinate in 250 ml. of ethanol was heated with stirring under reflux for overnight. The ethanol was removed on a rotary evaporator in vacuo. To the residual oil was added 250 ml. of conc. ammonium hydroxide solution. The reaction mixture was heated on a steam bath for a few minutes, cooled and filtered. The filtrate was acidified to pH 4 with concentrated hydrochloric acid solution. A crystalline product was deposited ( 2 g.). Recrystallization of the product from benzene gave a product with M.P. 146–148°.

*Analysis.*—Calc'd for $C_9H_{13}N_3O_3S$ (percent): C, 44.43; H, 5.38; N, 17.27. Found (percent): C, 44.27; H, 5.30; N, 17.34.

EXAMPLE II 5-hydroxy-3-methyl-1-(thiocarbamoyl)pyrazole-4-propionic acid, ethyl ester A mixture of 9.1 g. of thiosemicarbazide and 23.0 g. of diethyl 2-acetylglutarate in 250 ml. of ethanol was heated under reflux with stirring for 5 hours. The reaction mixture was taken to dryness on a rotary evaporator. The residual oil was treated with 100 ml. of 30% sodium hydroxide solution. When a clear solution was obtained the solution was cooled in ice and acidified to pH 4 with glacial acetic acid. A crystalline product was deposited (20.1 g.) which after recrystallization from ethanol gave a product with M.P. 149–150°.

*Analysis.*—Calc'd for $C_{10}H_{15}N_3O_3S$ (percent): C, 46.68; H, 5.88; N, 16.33; S, 12.46. Found (percent): C, 46.35; H, 6.00; N, 16.03; S, 12.36.

EXAMPLE III 2-acetylsuccinic acid, diethyl ester (4-methyl-3-thiosemicarbazone)

A mixture of 5.25 g. of 4-methyl-3-thiosemicarbazide and 10.8 g. of diethyl acetylsuccinate in 250 ml. of 95% ethanol was heated under reflux with stirring for 14 hours. On cooling the reaction mixture in ice a crystalline product was deposited which on recrystallization from ethanol gave a product with M.P. 84–85°.

*Analysis.*—Calc'd for $C_{12}H_{21}N_3O_4S$ (percent): C, 47.51; H, 6.98; N, 13.85. Found (percent): C, 47.18; H, 7.14; N, 13.70.

This compound while useful as an intermediate, also possesses immunosuppressive activity.

EXAMPLE IV 5-hydroxy-3-methyl-1-(methylthiocarbamoyl)pyrazole-4-acetic acid, ethyl ester Method A.—To 50 ml. of concentrated ammonium hydroxide was added 4.7 g. of 2-acetylsuccinic acid, diethyl ester (4-methyl-3-thiosemicarbazone). The mixture was warmed gently until a clear solution was obtained. The reaction mixture was cooled in ice and quickly neutralized with glacial acetic acid. A precipitate was deposited which was collected and recrystallized from ethanol. There was obtained 0.6 g. of product, M.P. 151–153°.

*Analysis.*—Calc'd for $C_{10}H_{15}N_3O_3S$ (percent): C, 46.68; H, 5.88; N, 16.33; S, 12.46. Found (percent): C, 46.37; H, 5.91; N, 16.72; S, 12.43.

Method B.—To 1.84 g. of 5-hydroxy-3-methyl-pyrazole-acetic acid, ethyl ester [F. H. McMillan and J. A. King, J. Am. Chem. Soc., 77, 3376 (1955)] in 125 ml. of dry tetrahydrofuran was added 0.73 g. of methyl isothiocyanate. The reaction mixture was heated under reflux for 12 hours. An equal volume of petroleum ether was added to the reaction mixture after it was allowed to cool to room temperature. A crystalline product was deposited, M.P. 148–151°, which gave no depression in M.P. upon admixture with the product prepared by Method A. Identical infrared spectra were also observed.

EXAMPLE V 5-hydroxy-3-methyl-1-(methylthiocarbamoyl)pyrazole-4-acetamide

To 100 ml. of concentrated ammonium hydroxide was added 6.4 g. 2-acetylsuccinic acid, diethyl ester (4-methyl-3-thiosemicarbazone). The mixture was heated on a steam bath for approximately 15 minutes. The solution thus obtained was cooled in ice and neutralized with glacial acetic acid. A precipitate was deposited which amounted to 3.6 g. after collection by suction filtration. This material was washed with hot ethanol and filtered. The portion of insoluble material was recrystallized from a large volume of ethanol, the pure product has a M.P. 181–183°.

*Analysis.*—Calc'd for $C_8H_{12}N_4O_2S$ (percent): C, 42.09; H, 5.30; N, 24.54; S, 14.04. Found (percent): C, 42.01; H, 5.41; N, 24.19; S, 13.79.

EXAMPLE VI 5-hydroxy-3-methyl-1-(thiocarbamoyl)pyrazole-4-propionic acid

To 50 ml. of 30% sodium hydroxide solution was added 3 g. of 5-hydroxy-3-methyl-1-(thiocarbamoyl)pyrazole-4-propionic acid, ethyl ester. The solution was allowed to stand at room temperature for 4 hours. The reaction mixture was acidified with glacial acetic acid. A precipitate was deposited which was collected and recrystallized from water. The recrystallized product had a M.P. of 186–187°.

*Analysis.*—Calc'd for $C_8H_{11}N_3O_3S$ (percent): C, 41.91; H, 4.84; N, 18.33. Found (percent): C, 41.58; H, 4.86; N, 18.62.

EXAMPLE VII 5-hydroxy-3-methyl-1-(thiocarbamoyl)pyrazole-4-acetic acid

A mixture of 4.56 g. of thiosemicarbazide and 10.8 g. of diethyl acetylsuccinate in 250 ml. of ethanol was heated with stirring under reflux overnight. The ethanol was removed on a rotary evaporator in vacuo. To the residual oil was added 250 ml. of 1 N sodium hydroxide solution. The reaction mixture was heated for 30 minutes at 50°. The reaction mixture was filtered and the filtrate acidified with concentrated hydrochloric acid. A precipitate was deposited which upon recrystallization from ethanol gave 2.3 g. of product, M.P. 178–179°.

*Analysis.*—Calc'd for $C_7H_9N_3O_3S$ (percent): C, 39.06; H, 4.21; N, 19.51. Found (percent): C, 39.35; H, 4.25; N, 19.69.

EXAMPLE VIII

By methods analogous to those employed above the following compounds are prepared. The solvent selected for carrying out the reaction and recrystallization should be $R_3OH$ so that transesterification will not result.

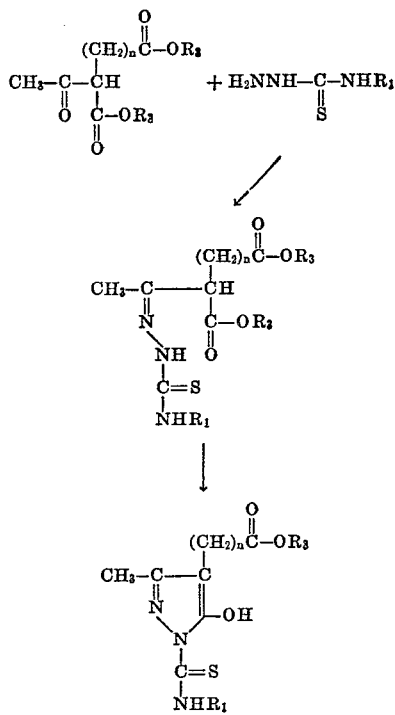

wherein $R_1$, $R_3$ and $n$ are as follows:

| $R_1$ | $R_3$ | $n$ |
|---|---|---|
| Ethyl | n-Propyl | 1 |
| n-Propyl | Methyl | 2 |
| Methyl | n-Butyl | 1 |
| n-Butyl | i-Propyl | 2 |
| n-Propyl | Ethyl | 2 |
| Methyl | Methyl | 1 |

We claim:
1. A compound selected from the group consisting of:

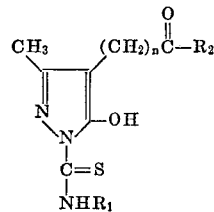

wherein $R_1$ is selected from the group consisting of hydrogen and (lower)alkyl; $R_2$ is selected from the group consisting of (lower)alkoxy, hydroxy and amino; $n$ is a whole integer of 1 or 2.

2. A compound as defined in claim 1 which is 5-Hydroxy-3-methyl-1-(thiocarbamoyl)pyrazole - 4-acetic acid, ethyl ester.

3. A compound as defined in claim 1 which is 5-Hydroxy-3-methyl-1-(thiocarbamoyl)pyrazole - 4 - propionic acid, ethyl ester.

4. A compound as defined in claim 1 which is 5-Hydroxy - 3-methyl-1-(methylthiocarbamoyl)pyrazole-4-acetic acid, ethyl ester.

5. A compound as defined in claim 1 which is 5-Hydroxy - 3 - methyl - 1 - (methylthiocarbamoyl)pyrazole-4-acetamide.

6. A compound as defined in claim 1 which is 5-Hydroxy-3-methyl-1-(thiocarbamoyl)pyrazole - 4 - propionic acid.

7. A compound as defined in claim 1 which is 5-Hydroxy-3-methyl-1-(thiocarbamoyl)pyrazole-4-acetic acid.

References Cited

UNITED STATES PATENTS 3,326,933  6/1967  Wright _____ 260—310

HARRY I. MOATZ, Primary Examiner

U.S. Cl. X.R.

260—481 R; 424—273